Nov. 17, 1953   M. E. PELAEZ   2,659,501
HOISTING DERRICK ADAPTABLE TO THE
FRAMES OF TRANSPORTATION VEHICLES
Filed March 13, 1948
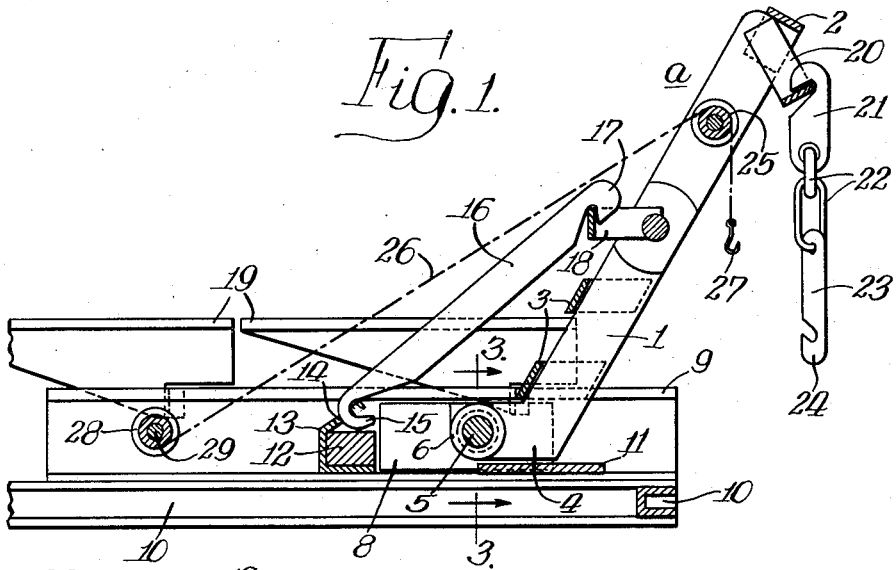
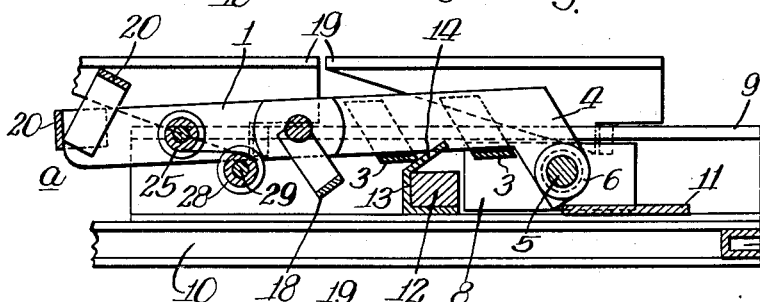
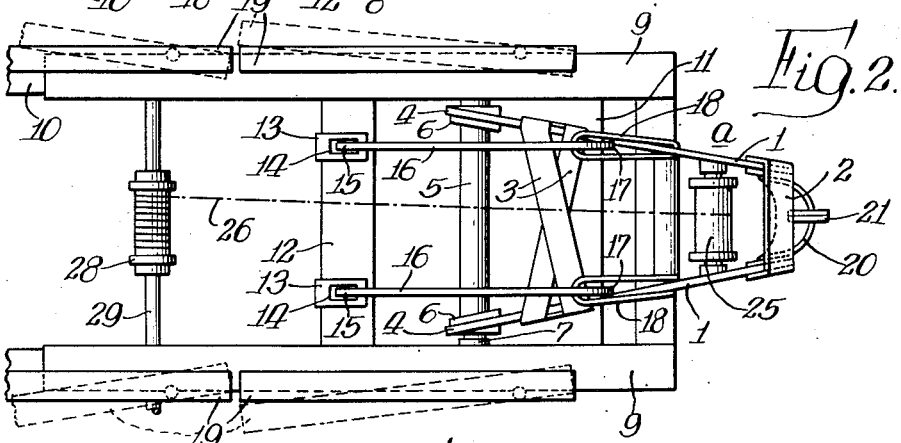
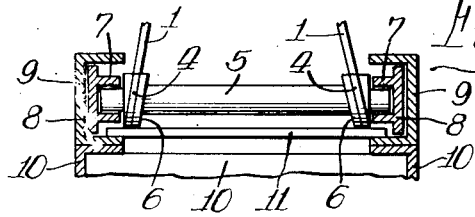
INVENTOR.
Manuel Eduardo Pelaez,
BY
ATTYS.

Patented Nov. 17, 1953

2,659,501

UNITED STATES PATENT OFFICE 2,659,501

HOISTING DERRICK ADAPTABLE TO THE FRAMES OF TRANSPORTATION VEHICLES

Manuel Eduardo Pelaez, Burzaco, Argentina

Application March 13, 1948, Serial No. 14,714

5 Claims. (Cl. 214—86)

The present invention relates to a hoisting derrick device adapted to be combined with the frame of automotive transportation vehicles, it being an essential object of this invention to provide a hoisting derrick adapted, by the mechanical combination of its constituent members, to be folded against the frame and thus make available the full cargo capacity of the vehicle for carrying all kinds of loads.

Transportation vehicles having mounted thereon a hoisting derrick are known at present, but due to the mounting of the hoisting device on the vehicle frame, such conveyances are designed only as a carrying means for the derrick. This is the case for instance, with wreckage trucks used for towing vehicles having suffered, for some cause or other, accidents disabling them in their normal running conditions. It stands to reason that the fact of limiting the use of such vehicles exclusively to transporting the hoisting device is a serious drawback inasmuch as other vehicles will be required for the transportation of loads other than vehicles to be towed.

The primary or essential object of the present invention thus fulfills the solution of a technical problem directed to the possibility of enlarging the scope of utility of so-called auxiliary vehicles, in that such conveyances are not only efficient in hoisting disabled vehicles and in towing them to the service station, if the magnitude of the damages makes such step necessary, but also accommodates effective use in the transportation of other loads. This latter use is rendered possible by the present invention, due to the fact that by tilting the derrick against the vehicle frame and supplementing the base used for guiding and supporting the derrick with plates acting as supporting floor members, said vehicle is apt to carry any kind of cargo—a factor which results in an appreciable saving in the number of vehicles required for different uses, inasmuch as, whenever required, the vehicles fitted with the hoisting appliance of the invention may be adapted for use in transportation of cargo in general.

In the structural order, the hoisting derrick or crane of the present invention is characterized by comprising a projecting arm formed by a metal structure consisting of two lateral beams engaging each other by intermediary engaging members.

Said beams, having an extension at their bases, are connected to each other by means of a shaft passing therethrough. Said shaft is journalled for rotation in bushings extending from sliding members comprising plates slidably mounted between channel-shaped guiding means secured to the longitudinal edges of the vehicle frame, said channel-shaped members forming in turn the supporting structure of the hoisting device. The channel members have fastened against their lower arm a beam from which hook-up members are adapted to extend to holding straps secured to the beams forming the derrick arm, in such manner as to keep the latter in a raised position. The connection of the transverse shaft associated with the base of the derrick arm, with free rotary movement in the bushings integral with the sliding members, accommodates tilting of the derrick against the vehicle frame. The channel members are supplemented with a number of hinged wings adapted to overlie the derrick arm or beams when the derrick arm is tilted against the frame, whereby the vehicle is adapted to carry useful cargo.

In order that the present invention may be fully understood and readily carried into practice, a practical embodiment of the hoisting device is disclosed by way of example in the accompanying drawings, wherein—

Figure 1 is a side view, partly in section and partly in elevation, showing the derrick in its raised position;

Figure 2 is a plan view of the assembly shown in Figure 1;

Figure 3 is a fragmentary sectional view of the assembly shown in Figure 1, the view being taken along the line 3—3 of Figure 1; and Figure 4 is a side view, partly in section and partly in elevation, showing the derrick in its lowered position.

In all of these views, the same reference numbers are used to designate the same or corresponding parts.

As disclosed in the drawings, the assembly is constituted in the following manner: A hoisting implement comprising a projecting arm of derrick a, is formed by a pair of beam members 1 which are secured to each other at their upper ends by means of a plate 2 forming the derrick head, and at their central portion by means of crossing plates 3. Both beams 1 have at their bases, extensions formed by plates 4 which extend at an obtuse angle to the beam. A shaft 5 is secured to the extensions 4 by means of connecting flanges 6. The shaft 5 extends through said extensions 4, and is journalled at both ends for free rotation thereof in bushings 7 formed integral with the plates 8. The plates 8 comprise slidable members mounted for sliding movement in channel-shaped members 9, these constituting a guiding and supporting frame for the projecting arm or derrick $a$.

Both channel members 9 are adapted to be secured in spaced parallel relation to the frame of any transportation vehicle, of which only the beams 10 are disclosed, said members having secured thereto against their lower arms both ends of a cross beam 11, which beam forms a supporting surface for the base of the beams 1, and the extensions 4, when the derrick $a$ is in raised position.

In the central portion approximately of the lower arms of both channel members 9, a cross member 12 is secured. Said cross member is provided with hook-up means 13, in the form of lugs, projecting at an angle from the upper surface of the cross member 12. The lugs 13 each have a slot 14 therein into which is inserted one of the hook-shaped ends 15 of supporting struts 16, whereas the other end 17 of the struts 16, which is also hook-shaped, is inserted in links 18 rigidly secured to the beams 1. This arrangement permits of keeping the derrick $a$ in a correctly raised position as clearly disclosed in Figure 1.

The channel members 9, on the outer edge of the upper flange thereof, are each provided with a pair of vertical pins upon which two wings 19 are pivotally mounted. The upper surface of the wings is spaced above the channels 9 so that the derrick $a$ may be folded toward the channels 9 to lie between the wings 19 and beneath the upper surface thereof. Thus, the wings 19 provide supporting surfaces for cover plates, not shown, adapted to constitute a floor for carrying cargo to be transported by the vehicle. The height of the wings 19 is calculated in such manner that on tilting the derrick $a$ and folding same against the cross member 12, the lower surface of the floor or cover plates will not touch the derrick. Due to the pivotal mounting of the wings, some sections of floor plate may be permanently secured to the wings without obstructing movement of the derrick.

The derrick $a$, adjacent to its head portion, carries a clamp 20 engaged by two straps 21 which through mediation of intermediate links 22 is engaged to a lower strap 23. The strap 23 has a hook-shaped end 24 for the purpose of securing thereto the vehicle to be towed, whenever necessary.

The hoisting device is completed by a spool or sheave 25 serving as a guide for a hoisting cable 26 carrying a hook 27, said cable being moved by a winch 28 mounted on a shaft 29 which is journalled in the channel members 9. From one of said channel members said shaft projects for the coupling thereto of an actuating crank—not shown—or, alternately, said winch may be connected to mechanical actuating means arranged within the reach of the driver of the vehicle.

While I have described what I regard to be a preferred embodiment of my invention, it will be appreciated that various changes, rearrangements and modifications may be made therein without departing from the scope of the invention, as defined by the appended claims.

I claim:

1. A hoisting device for vehicles having a main frame, comprising a pair of parallel spaced apart channel members connected to said main frame, plate members slidable in said channel members, a shaft extended transversely between said channel members and rotatably journaled in said plate members, a pair of beam members fastened to said shaft and inclined upwardly therefrom to project from the rear of the vehicle, detachable means connected between said channel members and said beam members normally supporting the latter in upper operative position, said slidable plate members and said shaft providing for swinging the upper end of said beam members toward the front of the vehicle into a recumbent position adjacent said channel members, winch mechanism carried by said channel members, a sheave carried by said beam members, and a hoisting cable trained from said winch mechanism over said sheave.

2. A hoisting device as defined in claim 1 wherein the detachable means connected between the channel members and the beam members comprises a transverse member secured to said channel members intermediate the ends thereof, and supporting struts connected between said transverse member and said beam members.

3. A hoisting device as defined in claim 1, wherein the detachable means connected between the channel members and the beam members comprises a transverse member secured to said channel members, inclined lugs having slots therein carried by and projecting upwardly from said transverse member, a link rigidly secured to the beam members intermediate their ends, and struts connected in the slots in said lugs and to said link.

4. A hoisting device as defined in claim 1, wherein the extreme outer ends of the beam members have means secured thereto for supporting the vehicle to be towed, and the winch means includes a sheave positioned on said beam members inwardly thereof from said last named means and over which the hoisting cable is trained.

5. A hoisting device as defined in claim 1, wherein the slidable plate members have integral bushing members thereon for receiving the shaft journaled in said plate members, said shaft being fixed to extensions connected to the lower ends of said beam members at an obtuse angle thereto.

MANUEL EDUARDO PELAEZ.

References Cited in the file of this patent

UNITED STATES PATENTS

| Number | Name | Date |
|---|---|---|
| 1,737,753 | Farnham | Dec. 3, 1929 |
| 2,145,378 | Trippensee | Jan. 31, 1939 |
| 2,283,443 | Klein | May 19, 1942 |